(12) United States Patent
Sajjaanantakul et al.

(10) Patent No.: US 10,909,433 B2
(45) Date of Patent: Feb. 2, 2021

(54) INFORMATION CARRIERS AND METHODS FOR ENCODING AND READING SUCH INFORMATION CARRIERS

(71) Applicants: HAYDALE TECHNOLOGIES (THAILAND) COMPANY LIMITED, Khlong Luang District (TH); HAYDALE GRAPHENE INDUSTRIES PLC, South Wales (GB)

(72) Inventors: Komkrit Sajjaanantakul, Khlong Luang District (TH); Sorawit Duangsripat, Khlong Luang District (TH); Natthapol Watthanawisuth, Khlong Luang District (TH); Arunwat Promnimit, Khlong Luang District (TH)

(73) Assignees: HAYDALE TECHNOLOGIES (THAILAND) COMPANY LIMITED, Khlong Luang (TH); HAYDALE GRAPHENE INDUSTRIES PLC, South Wales (GB)

(*) Notice: Subject to any disclaimer, the term of this patent is extended or adjusted under 35 U.S.C. 154(b) by 0 days.

(21) Appl. No.: 16/628,328

(22) PCT Filed: Jul. 5, 2018

(86) PCT No.: PCT/EP2018/068287
§ 371 (c)(1),
(2) Date: Jan. 3, 2020

(87) PCT Pub. No.: WO2019/008109
PCT Pub. Date: Jan. 10, 2019

(65) Prior Publication Data
US 2020/0311359 A1    Oct. 1, 2020

(30) Foreign Application Priority Data

Jul. 5, 2017 (TH) ................................. 1701003806
Nov. 13, 2017 (GB) .................................. 1718742.8

(51) Int. Cl.
*G06K 7/08* (2006.01)
*G06K 19/067* (2006.01)
(Continued)

(52) U.S. Cl.
CPC ......... *G06K 19/067* (2013.01); *G06F 3/0393* (2019.05); *G06F 3/04162* (2019.05);
(Continued)

(58) Field of Classification Search
CPC ........... G06K 7/10366; G06K 19/0723; G06K 19/067; G06F 3/0441; G06F 3/044
(Continued)

(56) References Cited

U.S. PATENT DOCUMENTS

| 4,522,890 A | 6/1985 | Volkers et al. |
| 8,803,814 B2 | 8/2014 | Andolina |

(Continued)

FOREIGN PATENT DOCUMENTS

| DE | 102012020365 A1 | 4/2014 |
| EP | 2 669 767 A2 | 12/2013 |

(Continued)

OTHER PUBLICATIONS

European Patent Office, International Search Report and Written Opinion issued in corresponding Application No. PCT/EP2018/068287, dated Sep. 20, 2018.
(Continued)

*Primary Examiner* — Ahshik Kim
(74) *Attorney, Agent, or Firm* — Stites & Harbison, PLLC; Jeffrey A. Haeberlin (57) ABSTRACT

The present invention relates to a method of encoding information on an information carrier, the method involving
(Continued)

providing the information carrier with an electrically conductive pattern on a substrate, wherein the pattern is configured to have different capacitance values at different parts of the electrically conductive pattern when placed on a capacitive touchscreen, wherein information is encoded based on said different capacitance values. Also provided are information carriers, and methods of reading information from such carriers. In preferred embodiments, the pattern comprises multiple pattern elements, and one or more of the pattern elements is a multilayer structure having a lower layer and an upper layer, wherein the conductivity of the upper layer is greater than that of the lower layer.

19 Claims, 6 Drawing Sheets (51) Int. Cl.
*G06K 7/10* (2006.01)
*G06K 19/07* (2006.01)
*G06F 3/039* (2013.01)
*G06F 3/041* (2006.01)
*G06F 3/044* (2006.01)

(52) U.S. Cl.
CPC ..... *G06K 7/10366* (2013.01); *G06K 19/0723* (2013.01); *G06F 3/044* (2013.01)

(58) Field of Classification Search
USPC ........................................................ 235/451
See application file for complete search history.

(56) References Cited

U.S. PATENT DOCUMENTS

| | | |
|---|---|---|
| 9,835,434 B1 | 12/2017 | Sloo et al. |
| 10,411,759 B2 * | 9/2019 | Thiele .................... G06K 7/081 |
| 10,664,065 B2 * | 5/2020 | Yao ........................ G03B 29/00 |
| 2012/0125993 A1 | 5/2012 | Thiele et al. |
| 2012/0194457 A1 | 8/2012 | Cannon |
| 2012/0306813 A1 | 12/2012 | Foerster et al. |
| 2013/0072303 A1 | 3/2013 | Mineur et al. |
| 2014/0342809 A1 | 11/2014 | Milligan |

FOREIGN PATENT DOCUMENTS

| | | |
|---|---|---|
| EP | 3 002 713 A1 | 4/2016 |
| GB | 2 347 771 A | 9/2000 |
| WO | 2016/071531 A1 | 5/2016 |

OTHER PUBLICATIONS

European Patent Office, Written Opinion of the International Preliminary Examining Authority issued in corresponding Application No. PCT/EP2018/068287, dated May 28, 2019.

European Patent Office, International Preliminary Report on Patentability (Chapter II) (International Preliminary Examination Report) issued in corresponding Application No. PCT/EP2018/068287, dated Sep. 17, 2019.

* cited by examiner

| | Experiment reference | Inks | Performance |
|---|---|---|---|
|  | A | Dark region = 6 mm diameter circles of high graphene conductive ink<br>Light region = 6 mm x 38 mm strip of conductive carbon black ink | Excellent |
| | B | Dark region = 6 mm diameter circles of high graphene conductive ink<br>Light region = 6 mm x 38 mm strip of low graphene conductive ink | Good |
|  | C | Dark region = 8 mm x 37 mm strip of low graphene conductive ink<br>Light region = 2.5 m diameter circles of silver ink | Poor |
|  | D | Dark region = 6 mm x 6 mm squares of high graphene conductive ink<br>Light region = 6 mm x 38 mm conductive carbon black ink | Excellent |
| | E | Dark region = 6 mm x 6 mm squares of high graphene conductive ink<br>Light region = 6 mm x 38 mm low graphene conductive ink | Good |
|  | F | Dark region = 0.3 mm x 10 mm rectangles of high graphene conductive ink<br>Light region = 25 mm x 10 mm silver ink | Poor |
|  | G | Dark region = 2.5 mm circle of silver ink<br>Light region = 1 mm circle of high graphene conductive ink | Poor |
| | H | Dark region = 2.5 mm circle of high graphene conductive ink<br>Light region = 2 mm circle of high graphene conductive ink | Poor |
| | I | Dark region = 4 mm circle of high graphene conductive ink<br>Light region = 2.5 mm circle of silver ink | Poor |

FIGURE 9A

| | Experiment reference | Inks | Performance |
|---|---|---|---|
|  | J | Dark region = 5 mm diameter circle of high graphene conductive ink<br>Light region = 3 mm width line of silver ink | Poor |
| | K | Dark region = 4 mm diameter circle of high graphene conductive ink<br>Light region = 2 mm width line of silver ink | Poor |
| | L | Dark region = 2 mm diameter circle of high graphene conductive ink<br>Light region = 2 mm width line of silver ink | Poor |
|  | M | Dark region = 20 x 20 mm square of low graphene conductive ink<br>Light region = 3 mm diameter circle of silver ink | Poor |
| | N | Dark region = 2 mm diameter circle of high graphene conductive ink | Poor |
| | O | Dark region = 3.5 mm diameter circle of high graphene conductive ink | Poor |

FIGURE 9B

INFORMATION CARRIERS AND METHODS FOR ENCODING AND READING SUCH INFORMATION CARRIERS

This application claims priority from TH 1701003806 filed 5 Jul. 2017, and GB1718742.8 filed on 13 Nov. 2017, the contents and elements of which are herein incorporated by reference for all purposes.

FIELD OF THE INVENTION

The present invention relates to an information carrier, methods for encoding information on the information carrier, and methods for reading information on the information carrier. In particular, it relates to an information carrier having a predetermined arrangement of electrically conductive elements, which can be read by a capacitive touch screen.

BACKGROUND

Several technologies are known for encoding information through means of printing or coating a pattern on a substrate.

For example, machine readable one-dimensional barcodes, which encode information by varying the widths of alternating dark and light parallel lines, have been known for decades. More recently, improvements in imaging technology and the prevalence of handheld electronic devices such as smartphones have facilitated the adoption of two-dimensional barcodes (such as Quick Response Codes, usually abbreviated to QR Code™), which can achieve increased information density. However, the visibility of these codes and their ease of printing means that they are readily reproduced. In addition, the need for the code to be visible and distinct can spoil the appearance of an item on which the code is applied (since it is not possible to add other visible features over the code, such as surface decoration), and can create difficulties when there is minimal space for provision of a dedicated area for the code.

More recently, technologies have been proposed which allow printed/coated patterns to be read by non-visual means.

For example, US 2012/0306813 and US 2012/0125993 describe information carriers comprising a pattern of conductive and non-conductive regions, which are readable by an electronic code reader. However, as noted in paragraph [0009] of US 2012/0306813 (originating from the same inventors as US 2012/80306813 and US 2012/0125993), a drawback of this technology is the need to have specialist devices to read out and decode the information. This adds expense, and is inconvenient compared to visual barcodes which can be read using standard equipment, such as barcode scanners, smartphones and tablet computers.

As a result, it has been proposed to develop similar systems which can be read by capacitive touchscreen technology—the type of touchscreens commonly used for smartphones and tablet computers.

For example, US 2012/0306813 proposes an information carrier which includes a dielectric and/or conductive pattern which can be read using the capacitive touch screen of a mobile electronic device through causing relative movement between the carrier and the touch screen. However, the solution proposed in this document suffers from a number of drawbacks.

Firstly, the information is encoded using the physical arrangement of the pattern, such as shape, orientation, number, distance between regions and/or relative position between regions (see paragraph [0025]), and the form of the relative movement. However, all of these features are readily derivable from visual inspection, which can allow counterfeiting.

Secondly, for the information carrier to function effectively the user must generally make physical contact with the dielectric and/or conductive pattern (for example, by placing a finger on a "coupling" area or an underlying conductive grid) so that the pattern adopts the user's potential (see paragraphs [0026]-[0027] and [0030]). However, this can be awkward. For example, the carrier must be designed to allow users to hold the carrier in the right manner whilst bringing it into contact with a flat touchscreen, and may require the user to remove gloves.

Finally, all of the substrate materials proposed in the document are non-conductive, limiting the range of applications for the technology.

US 2014/0342809 also describes a gaming item (such as a gaming voucher or chip) readable by a capacitive touchscreen. The item includes a pattern formed from dielectric and/or conductive ink (details of which are not given), where the number, size, shape and position of the pattern's features encode information. As with the device in US 2012/0306813, all of the pattern's features are readily derivable from visual inspection of the gaming item, which can facilitate counterfeiting.

GB2347771 describes a coding system to be used in the identification and sorting of postage items. Specifically, it describes envelope inserts including a conductive barcode pattern which can be read through an envelope by a detector by capacitive coupling. In the normal way with barcodes, the information is encoded only through the arrangement of stripes. In addition, the pattern is applied to a non-conductive substrate (see page 13, lines 10 to 22 of GB2347771).

WO2016/071531 describes an information carrier system which attempts to increase capacitive contrast between conductive pattern elements and conductive non-pattern elements (in particular conductive traces linking pattern elements)—see page 3, lines 8 to 11. This is achieved by overlaying the conductive pattern elements with a dielectric material having a first relative permittivity and overlaying the conductive non-pattern elements with a dielectric material having a second, lower relative permittivity (see page 5, line 29 to page 6, line 9). In other words, the device uses a non-conductive cover (outermost) layer to affect the detected signal from underlying conductive elements. Thus, the device does not seeks to "mask" non-pattern elements so that it is possible to accurately detect the desired pattern without deviation from the true physical pattern (see page 15, line 27 to page 16, line 18). Again, encoding of information is based on the size, shape and spatial configuration of the pattern elements (see page 4, line 31 to page 5, line 3). In addition, the device still specifies that a coupling area is included to couple in capacitance of a human user to the pattern elements (see page 5, lines 5 to 12).

Accordingly, there remains a need to develop information carriers with improved robustness against counterfeiting, which are readable using standard touchscreen technology. More generally, there remains a need to develop touchscreen-compatible information carriers which can encode a higher density of information, are easier to use, can be used on a wider variety of substrates, and/or which are made from relatively inexpensive materials.

The present invention has been devised in light of the above considerations.

SUMMARY OF THE INVENTION

The present inventors have found that, through appropriate design of electrically conductive pattern-forming elements provided on an information carrier, it is possible for conventional capacitive touchscreens to distinguish pattern-forming elements having different capacitance values. Based on this observation, the present inventors have developed methods and products which exploit these differences in capacitance to encode information, to act as an alternative or supplement to standard encoding based on the shape and position of the pattern-forming elements. Since the electrical properties of the different pattern-forming elements are not derivable from visual inspection, this improves the robustness of the device to counterfeiting. Separately, the present inventors have found that the use of transparent or translucent conductive materials for forming at least some of the electrically conductive pattern-forming elements can serve as an anti-counterfeiting measure.

Accordingly, in a first aspect, the present invention provides a method of encoding information on an information carrier, the method involving providing the information carrier with an electrically conductive pattern on a substrate, wherein the pattern is configured to have different capacitance values at different parts of the electrically conductive pattern when placed on a capacitive touchscreen, wherein information is encoded based on said different capacitance values. In other words, in the present invention differences in capacitance of the pattern itself are used to encode information instead of/as well as differences in capacitance between the pattern and the substrate on which the pattern is provided.

In a second aspect, the present invention provides a method of reading information from an information carrier using a capacitive touchscreen, the information carrier comprising an electrically conductive pattern on a substrate, the method involving:

placing the information carrier on or near to the capacitive touchscreen;
using the capacitive touchscreen to measure a capacitance map of the electrically conductive pattern, the capacitance map having different capacitance values at different positions of the electrically conductive pattern; and
decoding information from the information carrier based on the different capacitance values of the capacitance map.

By "capacitance map" we mean data linking capacitance values to position on the touchscreen, for example.

Advantageously, these approaches allow information to be encoded in terms of (i) the position of the pattern elements, (ii) the size of the pattern elements, and (iii) the electrical properties of the pattern elements. Encoding information in this way means that the information carrier can be difficult to counterfeit, both due to the number and nature of the different features for encoding information. In particular, the electrical properties of the pattern elements are not apparent from visual inspection of the device. Even if measurement of the electrical properties of the pattern elements is carried out, it is relatively difficult for a counterfeiter to replicate the information carrier, because to do so they would have to carefully select appropriate materials to produce pattern elements with the required electrical properties.

Suitably, the pattern is formed from pattern elements (at least a first and a second pattern element) which comprise or consist of a layer of conductive material provided on the substrate.

To achieve differences in the measured capacitance, the pattern may have variations in the conductivity and/or dielectric coefficient of material used to form the pattern. For example, the pattern may have a first pattern element and a second pattern element on the substrate, wherein differences in the conductivity and/or dielectric coefficient of the first pattern element compared to the second pattern element result in said different capacitance values used to encode information. This is in contrast to the proposal in US 2012/0306813, where conductivity and/or dielectric coefficient of a pattern compared to a non-conductive substrate are used to encode information, and there is no indication that differences in electrical properties of the pattern itself could be used as a means of encoding information. It is also different from WO 2016/071531 where different materials are used, but one material is used to "mask" underlying conductive elements so that they are not measured, and hence cannot contribute to information encoding.

Additionally or alternatively, differences in capacitance may be achieved by varying the thickness/height of the pattern. For example, the pattern may have a first pattern element and a second pattern element on the substrate, wherein the overall thickness/height of the conductive material forming the first pattern element is greater than the overall thickness/height of the second pattern element. This is in contrast to US 2012/0306813, where it is preferred that the pattern is "substantially flat" (see paragraph [0032]).

To achieve differences in conductivity and/or dielectric coefficient, said first pattern element and second pattern element may be made from different materials.

The present inventors have found that the aims of the patent are addressed best when the pattern is a multilayer structure. More specifically, advantageous results are achieved when the pattern has one or more (optionally, all) pattern elements having a multilayer structure with a lower layer and an upper layer, wherein the lower layer and upper layer have different conductivities and/or dielectric coefficients. Advantageously, this structure allows the conductivity and/or dielectric coefficient of the pattern element as a whole to be varied both through the choice of materials and through the dimensions of the different layers. In patterns incorporating several (three or more) pattern elements, this allows complex variations in electrical properties between the pattern elements using limited (e.g. two) materials, which provides a simple and cost effective method of encoding information.

The skilled reader understands that "upper" and "lower" are used to denote proximity to the substrate. The "lower" layer may be the lowermost layer of the pattern element, that is, in contact with the substrate. The "upper" layer may be the uppermost layer of the pattern element. Optionally, the upper layer is provided on the lower layer, that is, there are no intermediate layers between the upper and lower layer. In such embodiments, the pattern elements consist of the upper and lower layer. Alternatively, there may be intermediate layers (conductive layers) between the upper and lower layer.

Optionally, the first and second pattern elements share the same lower layer, but have separate upper layers.

For the avoidance of doubt, we note that the skilled reader understands that the term "pattern element" is used to refer to features of the pattern occurring at different positions across the surface of the substrate, as opposed to different layers of the pattern at a particular position on the substrate (such as the "upper layer" and "lower layer").

The present inventors have found that, to achieve optimum results, the upper layer should have a greater conductivity than the lower layer. The conductivity of the upper layer as a percentage of the conductivity of the lower layer may be, for example, more than 110%, more than 120%, more than 130%, more than 140%, more than 150%, more than 180%, more than 200%, more than 250%, more than 300%, more than 400%, more than 500%, more than 800%, or more than 1000%. This is in contrast to WO 2016/071531 where a conductive lower layer is overlaid with a non-conductive upper layer (that is, the upper layer has a lower conductivity than the lower layer).

In particular, it is preferred that the upper layer has a sheet resistance of no more than 500 Ω/square (for example 100 Ω/square to 500 Ω/square), and the lower layer has a sheet resistance greater than 500 Ω/square (for example, greater than 500 Ω/square to 1500 Ω/square).

Less preferably, the lower layer may have a high conductivity than the upper layer.

Optionally, each of the lower, upper, and any intermediate layers are formed from the same material. Alternatively, the lower and upper layers may be formed from materials having different conductivities and/or dielectric coefficients.

In one arrangement, one or more (preferably, each) of the pattern elements is formed from a multilayer structure having a lower layer formed from metal and an upper layer formed from a conductive carbon material, preferably a conductive carbon ink. Optionally, the lower layer is formed from a metal and the upper layer is formed from conductive carbon particles dispersed in a polymer matrix material. For example, it is possible for the lower layer to be formed from a metal (such as silver), and the upper layer to be formed from graphene particles dispersed in a polymer matrix material. In such instances, the polymer matrix material is preferably a conductive polymer such as PEDOT.

However, preferably, the lower layer is formed from a lower conductivity carbon ink, and the upper layer is formed from a higher conductivity carbon ink. Particularly preferred is an arrangement in which the lower layer is formed from a carbon black ink, and the upper layer is formed from a graphene particle ink, with the upper layer being more conductive than the lower layer.

Advantageously, the present inventors have found that this combination of materials allows the information carrier to be read effectively by standard capacitive touchscreen technology without the need for a user to make contact with the pattern elements to establish a potential difference, thus avoiding the need for the "coupling areas" described in US 2012/0306813. This significantly simplifies design and use of the information carrier, since the user does not need to be holding the information carrier in a particular way, or indeed holding the information carrier at all.

In addition, the present inventors have found that the information carrier can work with a broader range of substrates than the information carriers proposed in US 2012/0306813. In particular, the present inventors have found that when a pattern formed from a single layer of conductive material (such as silver) is applied to a conductive substrate (such as metal foil), the capacitive touchscreen is unable to distinguish the pattern from the substrate, since the differences are below the signal-to-noise ratio of standard touchscreens (in this regard, the substrates proposed in US 2012/0306813 are non-conductive—see paragraph [0024]). In contrast, surprisingly, the present inventors have found that the multilayer pattern elements proposed herein (e.g. having silver and conductive carbon layers) can be used effectively when printed on either non-conductive or conductive substrates.

Embodiments in which the lower layer and upper layer are formed from carbon inks are particularly preferred, since they can achieve good differentiation between pattern elements due to a high signal:noise ratio. In addition, the carbon inks are relatively easy to apply through printing, and are relatively cheap, opening up the possibility of the codes being applied to even relatively low cost products (in contrast to embodiments incorporating silver). Furthermore, it is possible for both carbon inks to be applied using the same printing methods, in contrast to other materials which might require different approaches to applying the different layers.

Advantageously, it is possible to vary the capacitance of different pattern elements by varying both the combined and relative thicknesses of the upper and lower layer materials. Thus, in multilayer embodiments, the pattern may include a first multilayer pattern element and a second multilayer pattern element, wherein the overall thickness of the first multilayer pattern element is greater than that of the second multilayer pattern element (e.g. more than 110%, more than 120%, more than 130%, more than 140%, more than 150%, or more than 200%). In addition, or alternatively, the ratio of the thickness of the upper layer to the lower layer may be greater for the first multilayer pattern element compared to the second multilayer pattern element (e.g. more than 110%, more than 120%, more than 130%, more than 140%, more than 150%, or more than 200%). The "thickness" denotes the depth of the conductive material, as measured in a direction perpendicular to the substrate's surface.

The thicknesses may be chosen so that the capacitance values of different elements fall within pre-assigned "bands". For example, the pattern might be arranged so as to provide "high" signal features, "medium" signal features, and "low" signal features. For example, the measured capacitance values may fall within the range of 0.01 to 1 μF, but be differentiated according to which part of the band they fall within.

The benefits deriving from the use of multilayer pattern elements mean that another aspect of the present invention provides an information carrier comprising an electrically conductive pattern provided on a substrate, the pattern having at least one multilayer pattern element including a lower layer and an upper layer ("lower" and "upper" denoting proximity to the substrate), wherein the conductivity of the upper layer is greater than that of the lower layer. Both the lower and upper layers are made from conductive materials. This type of structure is different to that proposed in WO 2016/071531 where a conductive lower layer is overlaid with a non-conductive upper layer.

In addition, in view of the above-described advantages, another aspect of the invention provides an information carrier comprising an electrically conductive pattern provided on a substrate, the pattern having a first pattern element made from a first material, and a second pattern element made from a second material, wherein the conductivity and/or dielectric coefficient of the first material is greater than that of the second material. Suitably, both the first and second materials are conductive. The pattern elements may be linked by conductive traces.

In addition, in view of the above-described advantages, another aspect of the invention provides an information carrier comprising an electrically conductive pattern provided on a substrate, the pattern having a first pattern element and a second pattern element, wherein the overall thickness of the first pattern element is greater than that of the second pattern element. For example, the second pattern element may have an overall thickness which is no more than 90%, no more than 80%, no more than 70%, no more than 60%, no more than 50%, no more than 40% or less, or no more than 30% of the first pattern element. The overall thickness of the second pattern element may be, for example, at least 10%, or at least 20% of the thickness of the first pattern element.

Separately, a further aspect of the invention providing anti-counterfeiting advantages is an information carrier having an electrically conductive pattern provided on a substrate, wherein the pattern is formed from a non-visible material (for example, a transparent or translucent conductive material). The pattern is provided on an external surface of the substrate, to allow the pattern to be brought into direct contact with a capacitive touchscreen.

Related to this aspect is a method of reading information from an information carrier using a capacitive touchscreen, the information carrier comprising an electrically conductive pattern on a substrate, the conductive pattern being formed from a non-visible (for example, transparent or translucent) conductive material, the method involving:

placing the information carrier on or near to the capacitive touchscreen;

using the capacitive touchscreen to measure a capacitance map of the conductive pattern; and decoding information from the information carrier based on the capacitance values of the capacitance map.

As noted above, the invention allows an applied conductive layer to be distinguished from an underlying conductive substrate. This feature in itself allows the provision of new methods. In particular, the present invention also provides a method involving:

providing an object having a conductive layer on a conductive substrate;

placing the conductive layer on or near to the capacitive touchscreen of a computer;

using the capacitive touchscreen to measure the capacitance of the conductive layer;

causing the computer to take an action based on the measured capacitance values.

In this system, the conductive layer may be arranged according to a particular pattern. However, it is not necessary for the conductive layer to be arranged in a particular pattern—the presence or absence of the conductive layer on the conductive substrate may itself be used as a source of information. For example, the presence of the conductive layer may be sufficient to verify the source of the object.

The information carriers set out in these aspects of the invention may have any of the preferred features discussed above or below.

Information Carrier

The information carrier may be any object on which it is useful to encode information. Examples of suitable information carriers include:

a card such as a bank card (for example, a payment card such as a credit card or debit card), store card (such as a loyalty card), membership card, identification card, playing card, business card, greeting card, or postcard;

a voucher, such as a discount voucher, gift voucher, gaming voucher, or voucher for objects in a computer game;

a ticket, such as a travel ticket (for bus, train, airplane etc), entrance ticket (for a museum, concert, cinema etc), or ticket to admission to restricted areas (both physical areas and virtual zones);

a label;

packaging (for example, food packaging, drug packaging, scent/perfume packaging, tobacco packaging, including bottles, boxes, cartons, tins, cannisters, films, blister packs, vials and the like);

money, such as bank notes;

a certificate (for example, proving the origin of a product or qualification);

an instruction leaflet;

a bill of delivery and/or sale;

abstracts of accounts; and all types of products, including consumers products such as cups, glasses and the like.

Pattern

The pattern provides a means of encoding information. The pattern takes any suitable form, such as 1-dimensional, or 2-dimensional bar code, or an image. The pattern preferably is made up of pattern elements which may have any suitable shape, such as dots, lines, polygons (square, rectangles, pentagon, hexagon), circles, ovals and the like. Alternatively, the pattern element may be, or form a constituent part of, an image.

The pattern is preferably formed by printing or coating techniques. Advantageously, this allows for easy manufacture, and can be used to obtain relatively thin features.

The maximum thickness of the pattern (the biggest measured distance between the substrate and the uppermost surface of the pattern) may be, for example, no more than 1000 µm, no more than 500 µm, no more than 400 µm, no more than 300 µm, no more than 200 µm, no more than 150 µm, no more than 100 µm, no more than 80 µm, no more than 60 µm, or no more than 40 µm. Advantageously, having a relatively thin pattern lessens the visual and mechanical impact of the pattern on the substrate, and can make it difficult for a potential counterfeiter to identify the position and shape of the pattern through touch. The lower limit for the maximum thickness of the pattern may be, for example, at least 0.1 µm, at least 0.5 µm, at least 1 µm, at least 2 µm, at least 5 µm, at least 10 µm, at least 20 µm, or at least 30 µm. For example, the pattern may have a maximum thickness of between 0.1 to 100 µm, 0.5 to 50 µm, or 1 to 30 µm. In instances where the relative height of pattern features is used to encode information, having a minimum pattern thickness can facilitate distinguishing between features of different height.

In instances where the pattern elements are multilayer structures, the individual layers may have an average (mean) thickness of, for example, no more than 500 µm, no more than 400 µm, no more than 300 µm, no more than 200 µm, no more than 150 µm, no more than 100 µm, no more than 80 µm, no more than 60 µm, or no more than 40 µm. The lower limit for the average (mean) thickness may be, for example, at least 0.1 µm, at least 0.5 µm, at least 1 µm, at least 2 µm, at least 5 µm, at least 10 µm, at least 20 µm, or at least 30 µm. The individual layers may have an average (mean) thickness of, for example, 1 to 50 µm, 2 to 30 µm, 2 to 20 µm, or 5 to 15 µm.

As stated above, in instances where there are multiple pattern elements having multilayer structures, the average thickness of each lower layer may be the same for all pattern elements, likewise for the upper layer. Optionally, however, the thickness of the lower and/or upper layer may be different for different pattern elements. For example, the average thickness of each lower layer may be the same across all pattern elements, whilst the average thickness of the upper layer varies between pattern elements (or vice versa). This latter scenario can simplify manufacture of patterns, because it means that a first layer of uniform thickness can be applied to form the lower layer, before being overprinted with a variable thickness upper layer.

The number of pattern elements forming the pattern is not particularly limited. There may be, for example, 2 or more, 3 or more, 4 or more, 5 or more, 6 or more, 7 or more, 8 or more, 9 or more, 10 or more, or 20 or more distinct pattern elements. The skilled reader understands that increasing the number of pattern elements can increase the amount of information which can be encoded by the information carrier.

The pattern may be formed by spatially separated pattern elements formed from conductive material. Alternatively, pattern elements may be provided on a continuous region of conductive material and correspond, for example, to areas of different height. For example, the information carrier may have a substrate having a wavy profile, overprinted with a continuous layer(s) of conductive material, where the pattern elements corresponding to the apex of each wave.

Each pattern element may have an area of, for example, no more than 1 $mm^2$, no more than 2 $mm^2$, no more than 3 $mm^2$, no more than 4 $mm^2$, no more than 5 $mm^2$, no more than 10 $mm^2$ or no more than 20 $mm^2$. Alternatively, each pattern element may have an area of, for example, at least 1 $mm^2$, at least 2 $mm^2$, at least 3 $mm^2$, at least 4 $mm^2$, at least 5 $mm^2$, at least 10 $mm^2$, or at least 20 $mm^2$.

Suitably, the pattern elements are in electrical contact. For example, where appropriate, the pattern elements may be connected by conductive traces. Optionally, the term "pattern element" as defined in the invention excludes conductive traces linking individual pattern elements.

Conductive Materials

Conductive materials suitable for forming the pattern elements (either in its entirety, or the above-described upper and lower layer of a multilayer pattern element) include, for example, metals (such as silver, gold, copper, aluminium, lead, iron, magnesium, tungsten, zinc, tin, chrome, molybdenum), conductive carbon materials (such as carbon black, graphite particles and graphene particles), conductive polymers (such as PEDOT polymers), and indium tin oxide. These conductive materials may be present as a filler dispersed in a binder, such as a polymer matrix material. In such instances, the materials may be applied as a conductive ink.

The conductive materials may be translucent or, more preferably, transparent. By "translucent" we mean that the conductive material permits visible light (e.g. light of wavelength 390 to 700 nm) to pass through but diffuses it so that objects on the opposite side are not clearly visible. By "transparent" we mean that the conductive material permits visible light to pass through with minimal diffusion so that objects on the opposite side are clearly visible. For example, the conductive material may transmit 80% or more, 90% or more, or 95% or more incident light between 390 to 700 nm. By "semi-transparent" we mean that the conductive material is partially transparent, for example, transmitting 40-80%. 50-80%, or 60-80% of visible light. By "visible light" we mean light of wavelength 390 to 700 nm.

The transparent or semi-transparent conductive material may be, for example, indium tin oxide or a transparent polymer such as PEDOT, the latter of which may contain a conductive filler in a transparent or semi-transparent polymeric matrix material.

Advantageously, when the conductive materials are (semi-)transparent or translucent, the pattern can be invisible or at least difficult to identify, at least at a distance. This helps to reduce the possibility of counterfeiting.

Optionally, the information carrier of the present invention incorporates graphene particles dispersed in a polymer matrix material. The graphene particles may be randomly dispersed in the polymer matrix material. The conductivity of graphene particles (which is higher than, for example carbon black and graphite) means that a conductive material can be formed at relatively low loadings. In addition, using carbon particles in this form allows the pattern elements to be applied using coating (e.g. printing) techniques, which facilitates manufacture.

Suitably, the graphene particles have a high aspect ratio. Advantageously, graphene particles having a high aspect ratio can form conductive paths at relatively low loading levels.

The graphene particles (which can be referred to as "graphene-material particles", or "graphene-based particles") may take the form of monolayer graphene (i.e. a single layer of carbon) or multilayer graphene (i.e. particles consisting of multiple stacked graphene layers). Multilayer graphene particles may have, for example, an average (mean) of 2 to 100 graphene layers per particle. When the graphene particles have 2 to 5 graphene layers per particle, they can be referred to as "few-layer graphene".

Advantageously, these forms of carbon nanoparticles provide extremely high aspect ratio conductive particles. This high aspect ratio allows the formation of conductive paths at relatively low loading levels.

The graphene particles may take the form of plates/flakes/sheets/ribbons of multilayer graphene material, referred to herein as "graphene nanoplatelets" (the "nano" prefix indicating thinness, instead of the lateral dimensions).

The graphene nanoplatelets may have a platelet thickness less than 100 nm and a major dimension (length or width) perpendicular to the thickness. The platelet thickness is preferably less than 70 nm, preferably less than 50 nm, preferably less than 30 nm, preferably less than 20 nm, preferably less than 10 nm, preferably less than 5 nm. The major dimension is preferably at least 10 times, more preferably at least 100 times, more preferably at least 1,000 times, more preferably at least 10,000 times the thickness. The length may be at least 1 times, at least 2 times, at least 3 times, at least 5 times or at least 10 times the width.

The loading of graphene particles in the polymer matrix material may be, for example, 0.25 wt. % or more, 0.5 wt. % or more, 1 wt. % or more, 2 wt. % or more, 5 wt. % or more, 10 wt. % or more, 15 wt. % or more, 20 wt. % or more, or 30 wt. % or more of the total weight of the conductive material. The upper limit for the loading of graphene particles in the polymer matrix material may be, for example, 1 wt. %, 2 wt. %, 5 wt. %, 10 wt. %, 15 wt. %, 20 wt. %, 30 wt. %, or 40 wt. If the loading is too high, then this can adversely affect the mechanical properties of the pattern (in particular, flexibility and stretchability), which can be problematic in certain applications. For these reasons, it is preferable for the loadings of the graphene particles to be in the range of, for example, 0.5 to 25 wt. %, or 0.5 to 5 wt. %.

The graphene particles are preferably uniformly dispersed throughout the polymer matrix material. However, it is not straightforward to achieve a suitably uniform dispersion of graphene particles since such particles have a powerful tendency to agglomerate, and are difficult to disperse in solvents and polymer materials. Therefore, preferably, the graphene particles are functionalised graphene particles, e.g. functionalised graphene or functionalised graphene nanoplatelets. That is, the graphene particles incorporate functional groups which improve the affinity of the nanoparticles for the solvents and/or polymer matrix material used to form the pattern elements, thus allowing a more uniform distribution of particles to be achieved. For example, the graphene particles may be oxygen-functionalised, hydroxy-functionalised, carboxy-functionalised, carbonyl-functionalised, amine-functionalised, amide-functionalised or halogen-functionalised.

Polymer Matrix Material

As noted above, the conductive material may be present as a filler dispersed in a binder. The binder may be a polymer matrix material.

The choice of the polymer matrix material will depend on the specific application for the information carrier. For example, in certain instances it will be advantageous for the pattern on the information carrier to be relatively flexible (for example, when the information carrier is a ticket or voucher), in which case it is advantageous for the polymer matrix material to be relatively flexible. In contrast, in situations where the information carrier is relatively rigid, the polymer matrix material does not need to be flexible, and other considerations may be relevant, such as mechanical strength, ability to adhere to the substrate, temperature stability, and the like.

Suitable materials include, for example, vinyl polymers (including polymers or copolymers of vinyl chloride, vinyl acetate and vinyl alcohol), polyester polymers, phenoxy polymers, epoxy polymers, acrylic polymers, polyamide polymers, polypropylenes, polyethylenes, silicones, elastomers such as natural and synthetic rubbers including styrene-butadiene copolymer, polychloroprene (neoprene), nitrile rubber, butyl rubber, polysulfide rubber, cis-1,4-polyisoprene, ethylene-propylene terpolymers (EPDM rubber), and polyurethane (polyurethane rubber). The polymer matrix material may be, for example, a copolymer of vinyl chloride, vinyl acetate and/or vinyl alcohol.

Preferably, the polymer matrix material is a conductive polymer. In particular, it is preferred that the polymer matrix material is PEDOT (poly(3,4-ethylenedioxythiophene). The present inventors have found particularly good results when graphene particles are dispersed in a PEDOT matrix.

The polymer matrix material may be a thermoplastic material. Alternatively, the polymer matrix material may be a thermosetting material.

Substrates

Suitable substrates for the information carrier include, for example, metals (such as metal foil), polymers (including plastics and elastomers), paper, card, carton, timber products (including derived timber products), composite materials, ceramics, glass, cloths, textiles, leather, and synthetic materials.

Optionally, the substrate is a metal, such as metal foil.

Optionally, the pattern is applied to an area of the substrate which is substantially flat. By "substantially flat" we mean a two-dimensional area with deviations of generally no more than 1000 μm, no more than 500 μm, no more than 200 μm, no more than 100 μm, or no more than 50 μm. Applying a pattern to a substantially flat area of the substrate can make it easier to place the pattern against a flat touchscreen.

Methods of Manufacture

Preferably, the information carriers of the present invention are formed by depositing a conductive ink on a substrate. Suitable printing techniques include, for example, screen printing, flexography, rotogravure, inkjet, and offset lithography. Therefore, in the above aspects, the pattern elements are preferably printed pattern elements.

In instances where the height/thickness of pattern elements is used to vary capacitance, the method of manufacture may involve:
- applying a layer of conductive material to a substrate to form a series of pattern elements; and
- applying a further layer of conductive material to only a subset of said pattern elements.

In such instances, each layer may be applied to a uniform thickness, but the application of a different number of layers of material to form the different pattern elements leads to the pattern elements having a different overall height.

Capacitive Touchscreen

The capacitive touchscreen may be provided on or connected to any type of computer device, for example, a tablet computer, a smartphone, a desktop computer, an ATM terminal, or a gaming machine. Alternatively, it may be a trackpad on a laptop or similar.

To operate, the information carrier is placed on or near to the capacitive touchscreen. By "near to" we mean that the information carrier is in sufficient proximity to the touchscreen to be protected. The required proximity will depend on the sensitivity of the touchscreen, and the characteristics of the touchscreen. For example, it may be necessary to position the pattern of the information carrier 2 mm or less, 1 mm or less, or 0.5 mm or less from the touchscreen.

Software

To allow the information encoded on the information carrier to be decoded, it is necessary to provide software to measure the information carrier (shape and/or capacitance of the pattern), decode the information, and take some action with that information.

Decoding the information may involve, for example, comparing the measured data against a database of patterns to identify a match, or to identify whether there is no match.

Additionally, or alternatively, decoding the information may not rely on pattern matching, but may instead compare the pattern against a set of rules which determine the information content. For example, the pattern may be in the form of a barcode or similar, in which case the information can be decoded without the need to pattern match.

Suitably, actions which can be triggered based on the information may be, for example, the storage of data connected to the use of the information carrier (for example, time, date, location), access to a restricted area (physical or virtual), launch of an app, or modification of an app which is already open (displaying a message), sending a message, opening a link to a webpage, video, song etc. Numerous other actions will occur to the skilled person.

The invention includes the combination of the aspects and preferred features described except where such a combination is clearly impermissible or expressly avoided.

BRIEF DESCRIPTION OF THE FIGURES

Embodiments and experiments illustrating the principles of the invention will now be discussed with reference to the accompanying figures in which.

DETAILED DESCRIPTION OF THE INVENTION

Figure 1A:
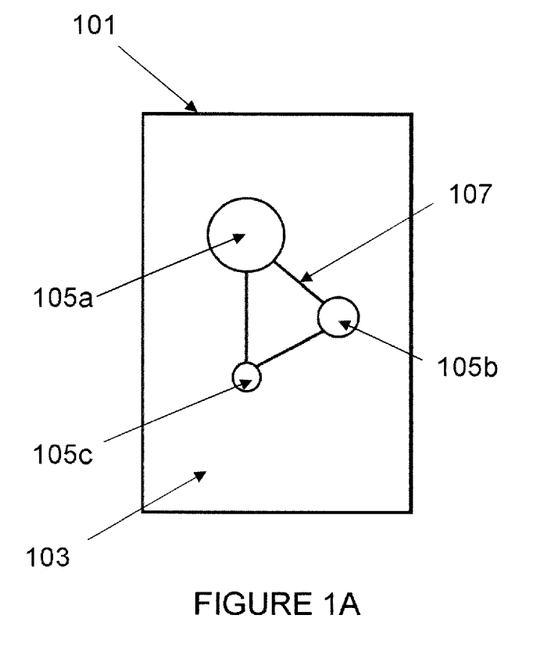
FIG. 1A shows a schematic view of an information carrier according to the present invention.
Figure 1B:
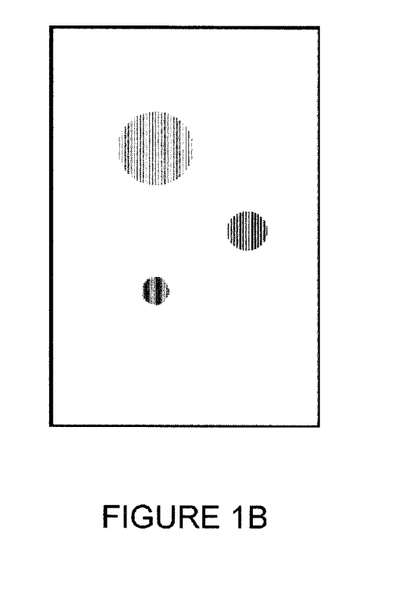
FIG. 1B shows the capacitance map measured for the information carrier in FIG. 1A.

FIG. 1A shows an information carrier of the present invention in the form of a voucher 101 having a flat plastic substrate 103 with pattern elements 105a, 105b, and 105c, connected by conductive traces 107. Pattern elements 105a, 105b and 105c are two-layer structures, having a lower layer of carbon ink (carbon black ink) and an upper layer of a transparent carbon ink (graphene nanoplatelets dispersed in a PEDOT binder). Each pattern element 105a, 105b and 105c has the same thickness lower layer, but a different thickness of the transparent carbon ink. When placed against a capacitive touchscreen a capacitance "map" is measured by the touchscreen. Such a map obtained on a smartphone screen is shown in FIG. 1B, where increasing density of the cross-hatching indicates increasing capacitance. The software on the smartphone is able to identify that the capacitance increases in the order 105a<105b<105c. The smartphone then compares this capacitance map against a pattern stored in its memory, to determine whether the measured information is a match in terms of the position and size of the pattern elements, and the relative magnitude of the measured capacitance of the pattern elements. Based on this information, the smartphone is able to verify whether the voucher is genuine or counterfeited.

Figure 2A:
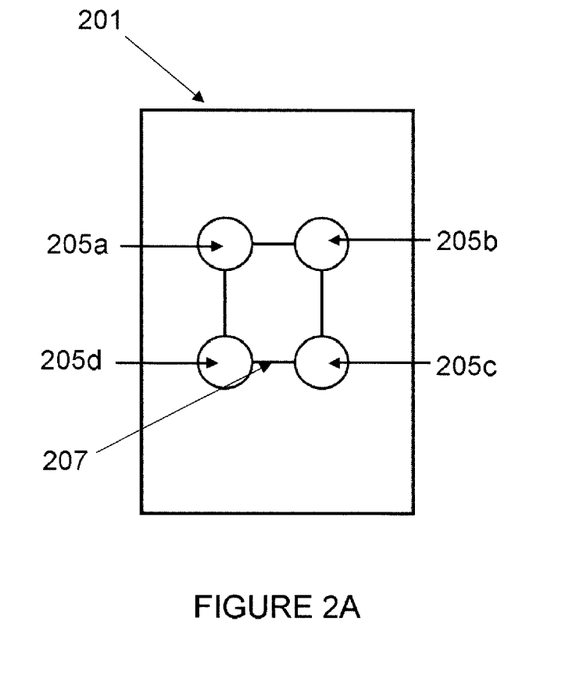
FIG. 2A shows a schematic view of another information carrier according to the present invention.
Figure 2B:
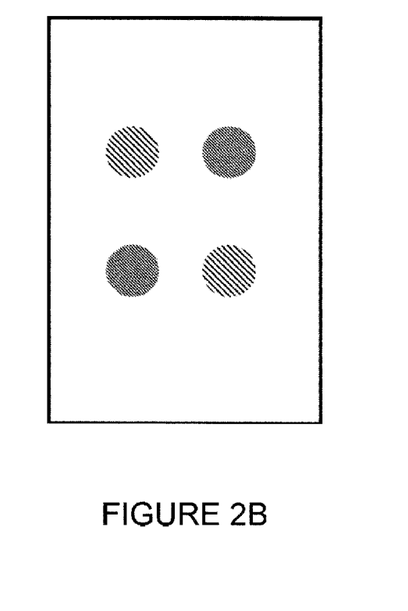
FIG. 2B shows a capacitance map measured for the information carrier in FIG. 1B.

FIGS. 2A and 2B show an alternative embodiment. In this instance, voucher 201 has a regular pattern of conductive pattern elements 205a, 205b, 205c, and 205d linked by conductive traces 207. Two materials having different conductivities are used for the construction of the pattern—one for pattern elements 205a and 205c, and another for 205b and 205d. When placed against a smartphone, these different materials register different capacitance values. In this case, the smartphone compares the arrangement of the capacitance values against a database of patterns to look for a match. When a match is found, the smartphone triggers an action associated with that pattern, for example, launch of an app, or opening a link to a webpage, video, song etc.

FIGS. 3 to 6 show different ways for producing different capacitance values on the capacitive touchscreen.

Figure 3:
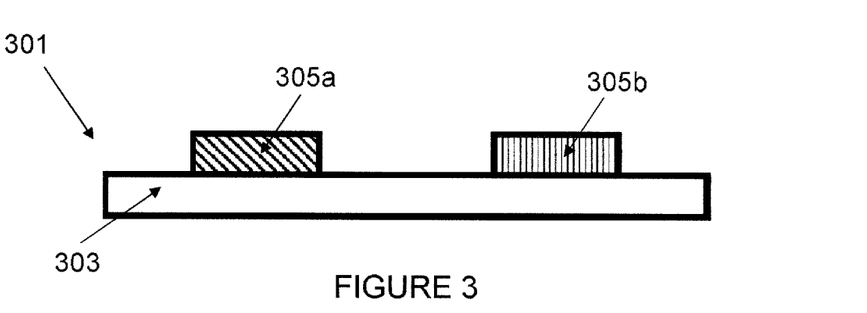
FIGS. 3-6 schematically shows pattern elements useful in the present invention.

In FIG. 3, label 301 has a paper substrate 303 having pattern elements 305a and 305b, which are formed from different conductive materials which produce different capacitance readings when placed on top of a smartphone screen.

Figure 4:
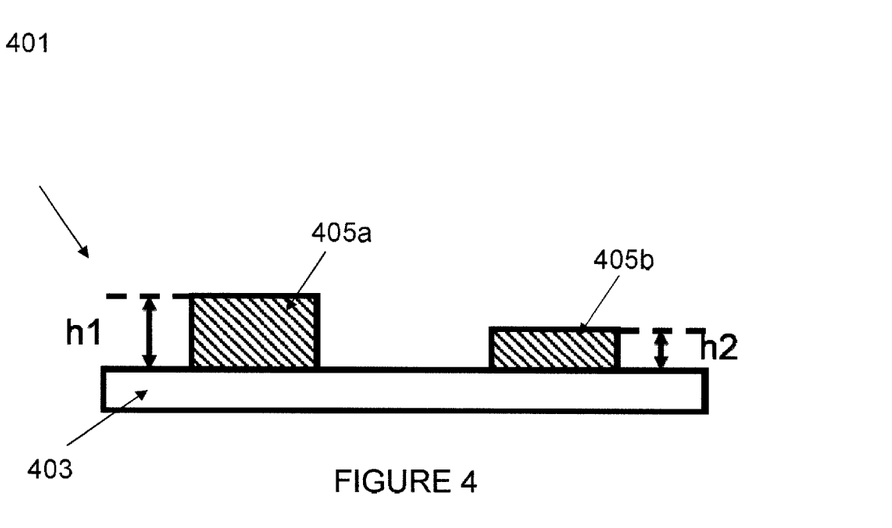

In FIG. 4, label 401 has pattern elements 405a and 405b which are printed to have different thicknesses, and hence have different heights relative to the surface of substrate 403. This means that when the label 401 is inverted and placed against a touchscreen pattern element 405a directly touches the screen, whereas pattern element 405b is separated from the screen by a short distance which is nevertheless still able to register a (relatively lower) capacitance on the touchscreen.

Figure 5:
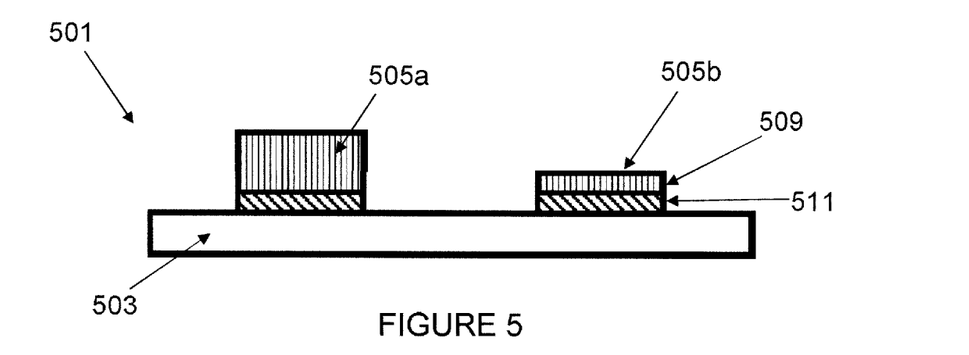

In FIG. 5, packaging 501 has a metal foil substrate 503 over printed with pattern elements 505a and 505b. Each of the pattern elements is a two-layer structure, having a lower layer of carbon black ink 511 and an upper layer 509 of a graphene nanoplatelets ink (having graphene nanoplatelets+PEDOT as a binder). The thickness of the lower layer 511 is the same for both pattern elements, but the upper layer 509 differs. By use of the two-layer structure, the smartphone is able to effectively distinguish between the conductive pattern elements and the conductive foil substrate.

Figure 6:
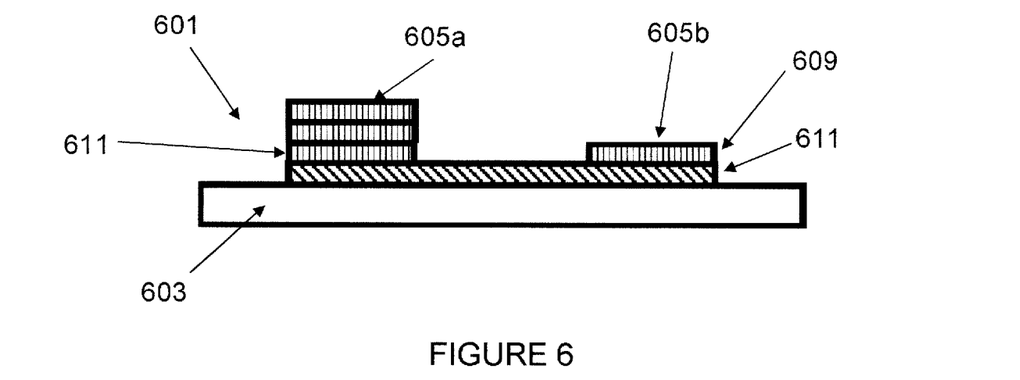

In FIG. 6, packaging 601 has a cardboard substrate 603 over printed with pattern elements 605a and 605b. The pattern elements share a common lower layer 611, but have distinct upper layer 609. Pattern element 605a has two intermediate layers 611 between the lower layer 611 and upper layer 609. The pattern is formed by first printing a layer of conductive ink to form the lower layer 611, overprinting with a second layer of conductive ink and then, in the case of pattern element 605a, overprinting with two further layers of the conductive ink. In this case, the conductive ink used to form layers 611 and 609 is the same.

Figure 7:
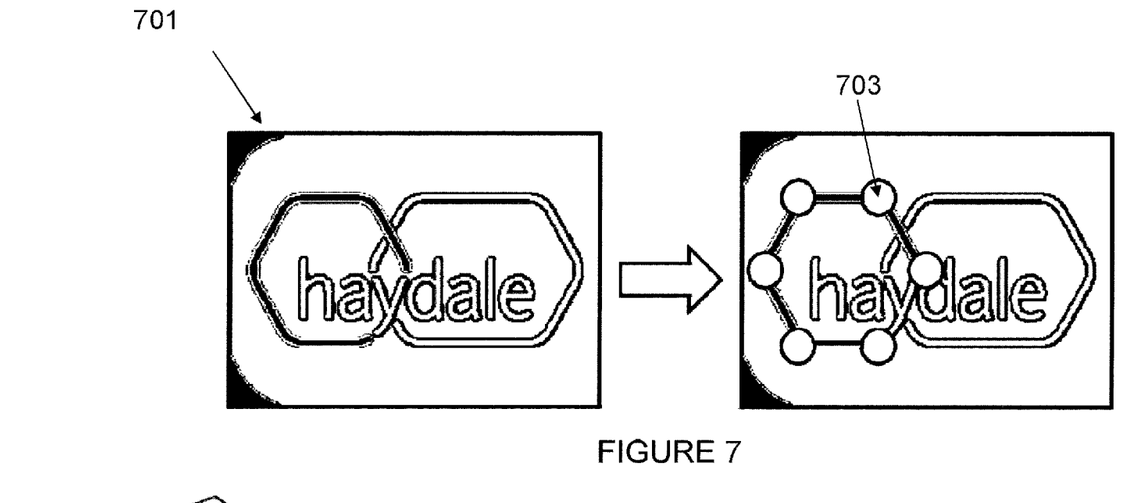
FIG. 7 schematically shows a transparent pattern applied to a logo the surface of packaging.
Figure 8:
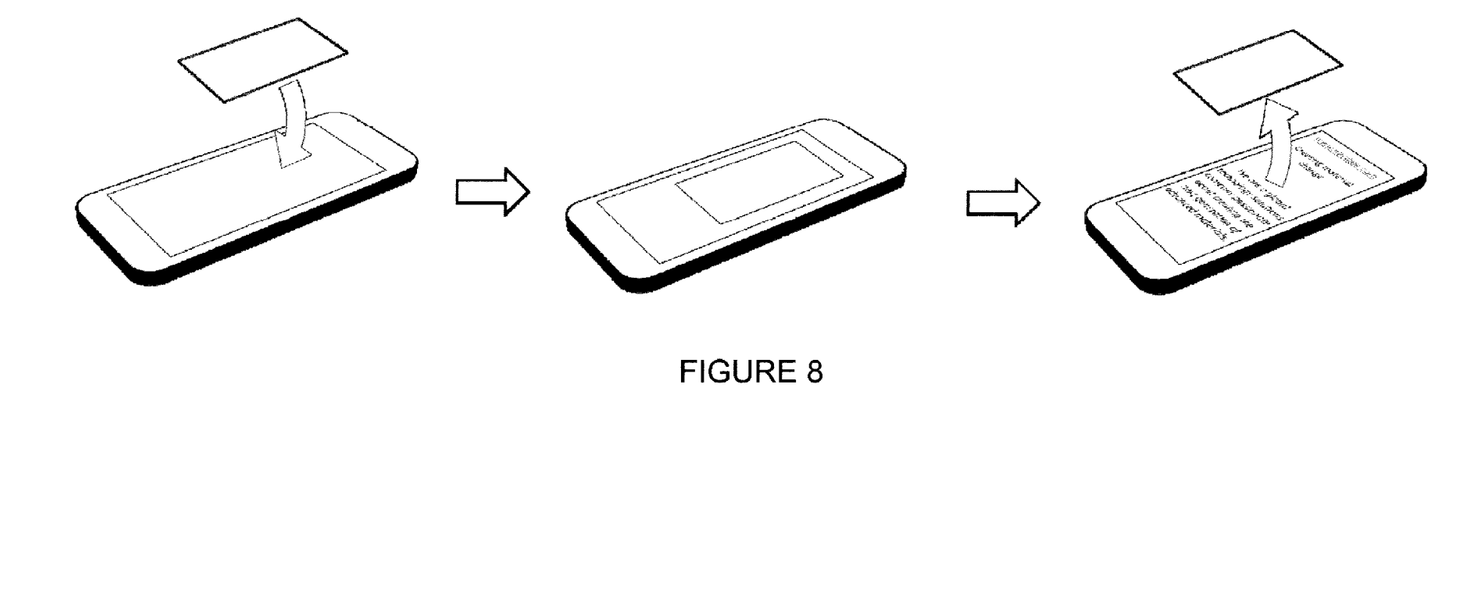
FIG. 8 shows interaction between an information carrier of the present invention and the capacitive touchscreen of a smartphone.

FIG. 7 shows the rear of a business card 701, incorporating a pattern of conductive ink circles 703 underlying the paper exterior. In FIG. 8, the business card is placed against the screen of a smartphone operating a business-card recognition app, for example, an app specifically designed for a particular networking conference. The app compares the measured capacitance map against a database, finds a match, and loads the website for the company with which the business card is associated.

EXAMPLES

Experiment 1—Non-Conductive Substrate

Figure 9A:
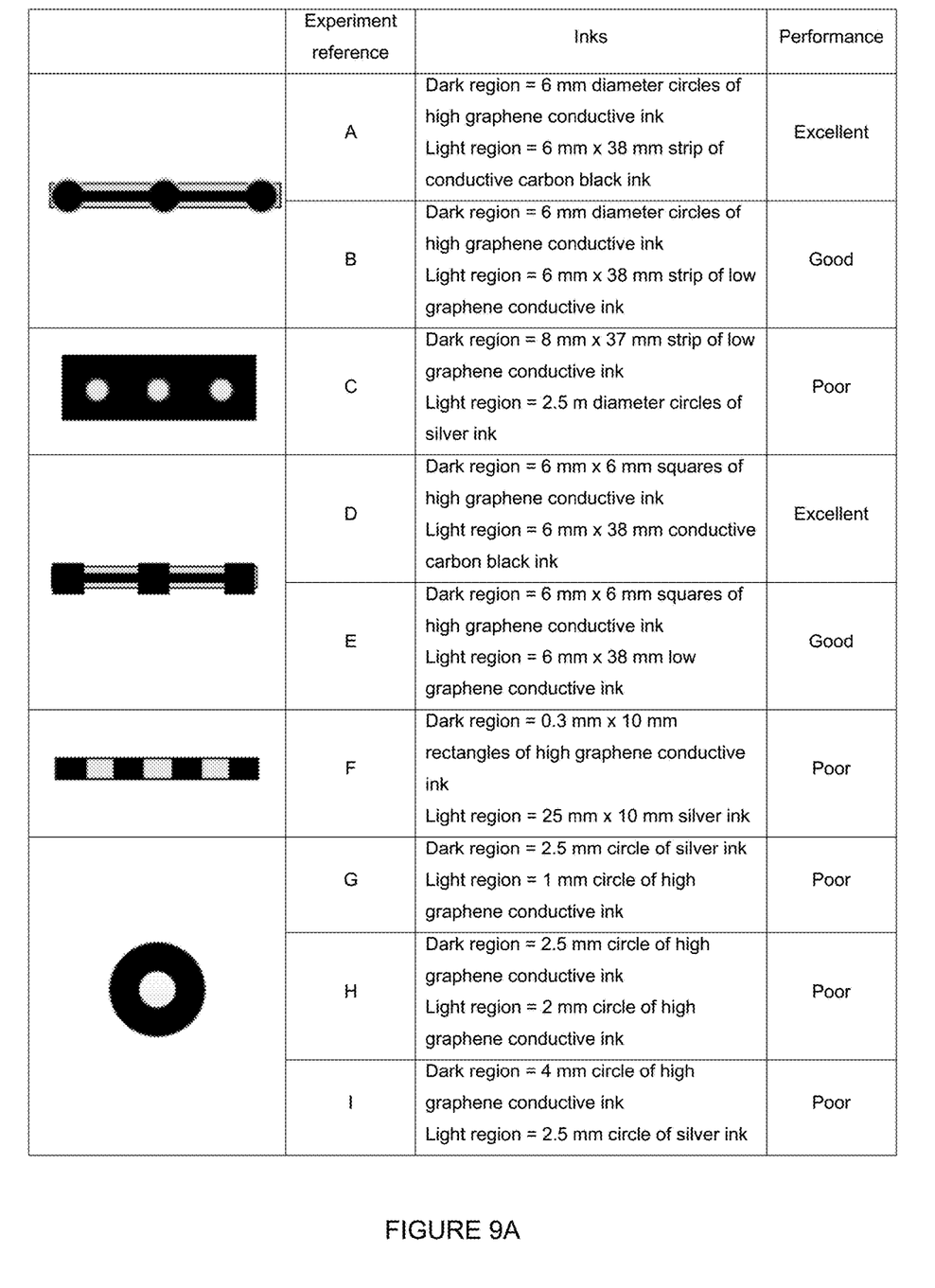
FIG. 9A and FIG. 9B comprise a table which shows the relative performance of a variety of patterns formed by screen printing conductive inks on polyethylene terephthalate (PET) sheets in an Experiment 1.
Figure 9B:
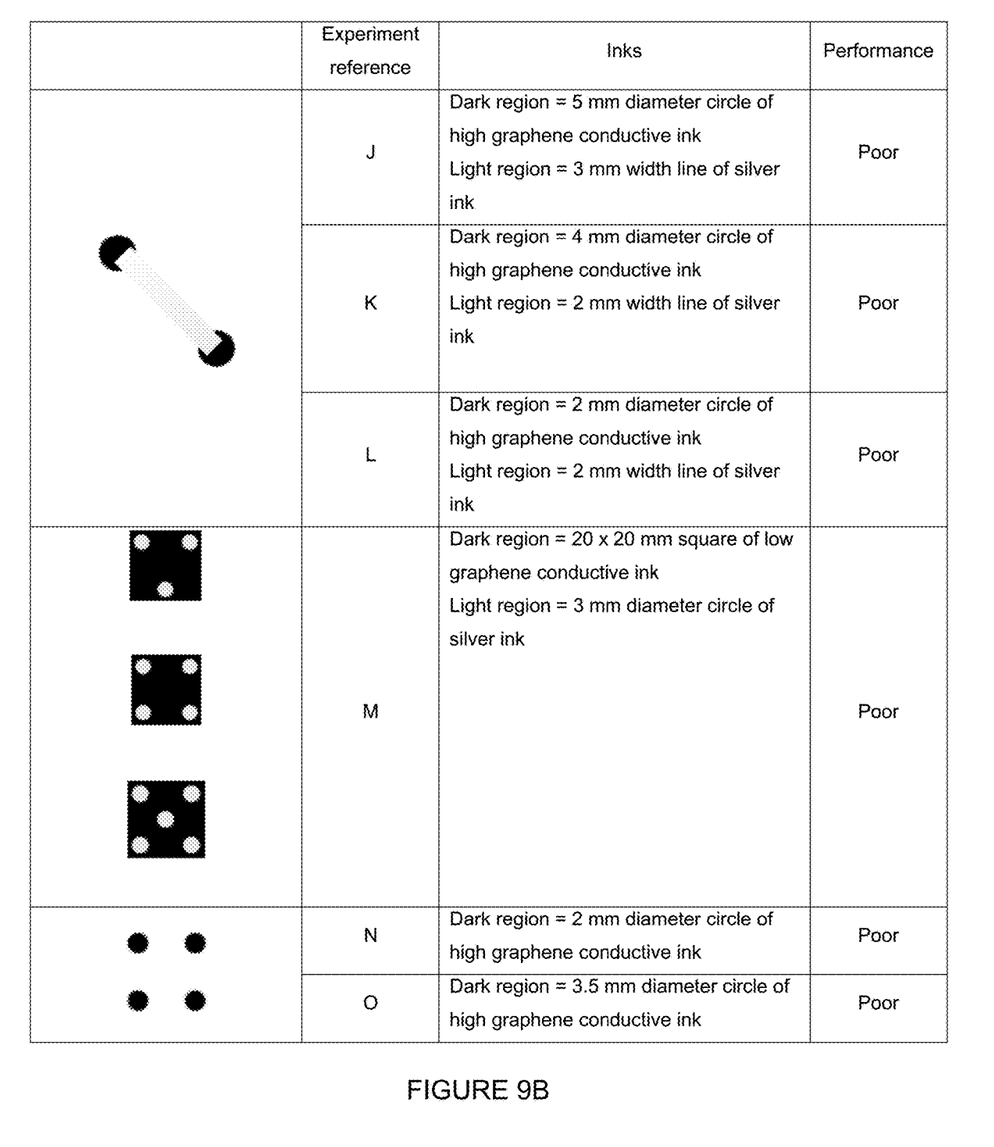

A variety of patterns were formed by screen printing conductive inks on polyethylene terephthalate (PET) sheets, as shown in FIGS. 9A and 9B. Several of the patterns incorporated two layer features, with the lower and upper layers printed with nylon mesh numbers of 39 and 100 respectively.

Capacitance measurements carried out using the capacitive touchscreens of both an Android® smartphone and an Apple iPhone®. The patterns were assessed using custom written software which assessed the accuracy of pattern detection (in terms of location), strength of the detected signal compared to background, and the stability of the assessed signal when the pattern was rested on the smartphone screen. After assessing all of the printed patterns, the relative performance was rated as either "excellent", "good", "fair" or "poor".

As can be seen from FIGS. 9A and 9B, the patterns printed using a conductive carbon black ink as a lower layer and higher conductivity graphene-based ink as an upper layer produced excellent performance (see experiments A and D). Patterns in which the carbon black lower layer was replaced with a lower conductivity graphene-based ink also showed good performance (see experiments B and E), but those in which this layer was replaced by a conventional silver layer had poor performance (see experiments C, F, I and M). In addition, a pattern formed solely from the higher conductivity graphene ink showed poor performance, even when printed as a two layer structure (see experiments N and O, and two-layer experiment H). Furthermore a pattern in which the lower layer was a higher conductivity graphene-based ink and the upper layer was silver ink had poor performance (see experiment G).

Taken together, these results indicate that patterns formed with a lower layer of carbon black ink and upper layer of graphene-based ink produce the best performance. The level of signal detected for the carbon black and graphene-based ink is sufficient to allow features to be reliably provided that have measurably distinct capacitance levels, thus allowing information to be encoded based on different capacitance levels.

Experiment 2—Conductive Substrate

An experiment was carried out in a similar manner to that described above in relation to Experiment 1, but with the pattern printed on a conductive substrate. The pattern could be reliably detected, indicating that the present invention is compatible with conductive substrates.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps. It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

All documents mentioned in this text are incorporated herein by reference.

What is claimed is:

1. A method of encoding information on an information carrier, the method involving providing the information carrier with an electrically conductive pattern on a substrate, the pattern comprising multiple pattern elements, and one or more of the pattern elements having a multilayer structure having a lower layer and an upper layer, the lower layer being in closer proximity to the substrate than the upper layer,
wherein both the upper layer and lower layer are made from conductive materials and the conductivity of the upper layer is greater than that of the lower layer,
wherein the pattern is configured to produce different capacitance values for different pattern elements at different parts of the electrically conductive pattern when placed on a capacitive touchscreen, and
wherein information is encoded based on said different capacitance values of different pattern elements.

2. A method according to claim 1, wherein the upper layer has a sheet resistance of no more than 500 Ω/square, and the lower layer has a sheet resistance greater than 500 Ω/square.

3. A method according to claim 1, wherein the upper and lower layers are made from carbon inks.

4. A method according to claim 3, wherein the carbon inks comprise graphene particles dispersed in a polymer matrix material.

5. A method according to claim 4, wherein the lower layer is a layer of carbon black dispersed in a polymer matrix material, and the upper layer is formed from graphene particles dispersed in a polymer matrix material.

6. A method according to claim 5, wherein the polymer matrix material of at least the upper layer is PEDOT (poly(3,4-ethylenedioxythiophene)).

7. A method according to claim 5, wherein the loading of graphene particles in the upper layer is between 0.5 to 25 wt. % of the layer.

8. A method according to claim 1, wherein variations in the conductivity and/or dielectric coefficient of material used to form the electrically conductive pattern are used to produce said different capacitance values.

9. A method according to claim 1, wherein variations in the thickness/height of the pattern are used to produce said different capacitance values.

10. A method according to claim 1, wherein the substrate is a metal.

11. A method of reading information from an information carrier using a capacitive touchscreen, the information carrier comprising an electrically conductive pattern on a substrate, the pattern comprising multiple pattern elements, and one or more of the pattern elements having a multilayer structure having a lower layer and an upper layer, the lower layer being in closer proximity to the substrate than the upper layer, wherein both the upper layer and lower layer are made from conductive materials and the conductivity of the upper layer is greater than that of the lower layer, the method involving:
placing the information carrier on or near to the capacitive touchscreen;
using the capacitive touchscreen to measure a capacitance map of the electrically conductive pattern, the capacitance map being data linking capacitance values to position on the touchscreen, and the capacitance map having different capacitance values for different pattern elements at different positions of the electrically conductive pattern; and
decoding information from the information carrier based on the different capacitance values of the capacitance map.

12. An information carrier comprising a substrate and an electrically conductive pattern provided on the substrate, the pattern having at least one multilayer pattern element wherein the pattern element includes a lower layer and an upper layer, the lower layer being in closer proximity to the substrate than the upper layer, wherein both the upper layer and lower layer are made from conductive carbon materials and the conductivity of the upper layer is greater than that of the lower layer.

13. An information carrier according to claim 12, wherein the conductive carbon materials of the upper and/or lower layer comprises graphene particles dispersed in a polymer matrix.

14. An information carrier according to claim 12, wherein the lower layer is a layer of carbon black dispersed in a polymer matrix material, and the upper layer is formed from graphene particles dispersed in a polymer matrix material.

15. An information carrier according to claim 14, wherein the polymer matrix material is PEDOT.

16. An information carrier according to claim 14, wherein the loading of graphene particles in the upper layer is between 0.5 to 25 wt. % of the layer.

17. An information carrier according to claim 12, having a first pattern element and a second pattern element, wherein the thickness/height of the first pattern element is greater than that of the second pattern element.

18. An information carrier according to claim 12, wherein the electrically conductive pattern is formed from a material that is translucent or transparent to light of wavelength between 390 to 700 nm.

19. A method involving:

providing an information carrier including a conductive substrate and an electrically conductive pattern provided on the conductive substrate, the pattern having at least one multilayer pattern element wherein the pattern element includes a lower layer and an upper layer, the lower layer being in closer proximity to the conductive substrate than the upper layer, wherein both the upper layer and lower layer are made from conductive carbon materials and the conductivity of the upper layer is greater than that of the lower layer;

placing the conductive pattern on or near to the capacitive touchscreen of a computer;

using the capacitive touchscreen to measure the capacitance of the conductive pattern; and causing the computer to take an action based on the measured capacitance values.

* * * * *